UNITED STATES PATENT OFFICE.

DEE W. KIRBY AND COLUMBUS H. HOWARD, OF GURDON, ARKANSAS.

COTTON-CHOPPER.

1,122,948.  Specification of Letters Patent.  Patented Dec. 29, 1914.

Application filed July 3, 1914. Serial No. 848,887.

*To all whom it may concern:*

Be it known that we, DEE W. KIRBY and COLUMBUS H. HOWARD, citizens of the United States, residing at Gurdon, in the county of Clark and State of Arkansas, have invented certain new and useful Improvements in Cotton-Choppers, of which the following is a specification, reference being had to the accompanying drawings.

This invention relates to new and useful improvements in cotton choppers and more particularly to a cotton chopper which is known as a rotary chopper, the main object of the present invention being the provision of a cotton chopper which includes a main drive shaft, a reciprocating shaft disposed at right angles to the drive shaft, movable means connecting the drive shaft with the reciprocating shaft, and means for raising and lowering said reciprocating shaft with respect to the driving shaft.

Another object of the present invention is the provision of a cotton chopper of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

Figure 1:
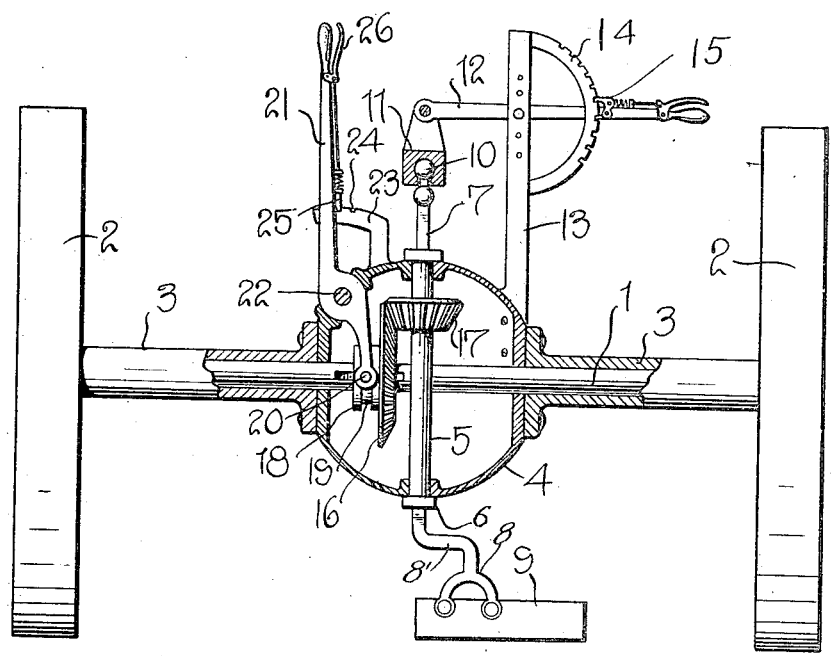
Figure 2:
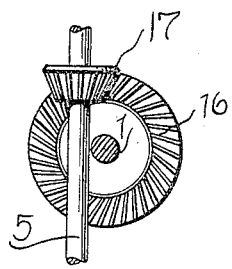

In the accompanying drawings forming a part of this application, Figure 1 is a longitudinal sectional view illustrating a cotton chopper constructed in accordance with our invention; and Fig. 2 is a detail plan view illustrating the manner of connecting the gears.

Referring more particularly to the drawing, 1 indicates the axle or main drive shaft of our improved cotton chopper, having mounted upon each end thereof the wheels 2, and arranged upon the axle 1, are the casings 3, the inner ends of which are bolted or otherwise secured to the housing 4, which incloses the operating mechanism of the chopper. Extending through the housing 4, at right angles to the main shaft or axle 1, is a tubular casing 5, the ends of which are provided with collars or sleeves 6 adapted to bear against the outer face of the casing 4 to prevent longitudinal movement of the casing within the housing. The interior of the casing 5 is preferably rectangular in cross section and movable longitudinally therethrough is a connecting rod 7, the lower end of which is forked, as shown at 8 and bolted or otherwise secured to the upper edge of the cutting blade 9. It will be noted that the lower end of the rod 7, above the forks 8, is bent upon itself to form a crank portion 8', which is so arranged as to rotate the plate 9 in a circle. The upper end of the rod 7 is provided with the ball portion 10 upon which is loosely mounted a block 11 and pivotally connected to the upper end of the block is a lever 12 which is pivotally mounted upon an upright supporting bar 13.

Supported by the bar 13 and extending outwardly at right angles thereto, is a rack 14 adapted to be engaged by the pivoted pawl 15 carried by the lever and normally retained into locking engagement with one of the notches of the rack. The lever 12 may be quickly and readily adjusted by yieldable pressure upon the handle of the pivoted pawl, whereby to disengage the same from the teeth of the rack 14, so that the lever may be moved back and forth, according to the adjustment required. It will be apparent from the foregoing that by having the shaft or rod 7 of substantially rectangular form, the same may be raised and lowered without interfering with the operation of the machine.

Slidably mounted upon the shaft or axle 1, is a gear 16 which is adapted to mesh with a gear 17 mounted upon the casing 5 and disposed at right angles to the first gear. It will be noted that the first gear 16 is so arranged that it may be readily slid upon the axle when it is desired to rotate the blade 9 or retain the same against movement. The lever 12 is shifted upon the rack 14 until the spring actuated lug thereof engages within the notches formed in the outer periphery of the same, when it is desired to raise and lower the blade 9. Formed integral with the outer face of the gear 16, is a sleeve 18 having a groove 19 formed in the periphery thereof in which the pins 20 are arranged, so that the sleeve 18 may be rotated with the gear 16, without interfering with the shifting mechanism.

The gear 16 is moved longitudinally upon the shaft 1 by means of a lever 21 which is pivotally mounted, as shown at 22 within one side of the casing 4, the lower end of said lever being bifurcated to form spaced arms adapted to be arranged upon opposite sides of the sleeve 18 and in which the pins 20 are arranged. From this it will be noted that upon pivotal movement of the lever 21, the gear 16 will be moved longitudinally upon the shaft and engage and disengage the gear 16 with the gear 17. Formed upon the upper side of the casing 4, is a rack 23 having notches 24 formed therein adapted to receive the spring retained lug 25 which is actuated by means of a pivoted handle 26 whereby the lug 25 may be engaged with the notches 24 and disengaged therefrom when it is desired to shift the gear 16 to engage or disengage the same with the gear 17.

It will be noted that by having the bore of the casing 5 formed substantially rectangular in cross section and the rod 7 formed rectangular, they will both be rotated simultaneously through the rotation of the gears 16 and 17. In order to provide means for moving the cutting blade 9 in a circle, the lower bifurcated end of the member 7 is secured to the blade in such a manner that upon rotation of the same, the blade will rotate in a circle. It will be apparent from the foregoing that we have provided a simple and durable cotton chopper wherein the mechanism is disposed entirely within the casing and is so arranged that the cutting blade may be quickly and readily actuated when desired. It will also be apparent that the device is extremely simple in construction and can be manufactured and placed upon the market at a comparatively low cost.

While we have shown and described the preferred form of our invention, it will be obvious that various changes in the details of construction and in the proportions may be resorted to for successfully carrying our invention into practice, without sacrificing any of the novel features or departing from the scope of the invention, as defined by the appended claims.

Having thus described this invention, what we claim is:—

1. A device of the class described including a driving shaft, a housing supported upon said shaft, a transverse shaft extending through the housing at right angles to the driving shaft, a gear carried thereby, a second gear mounted upon the shaft for rotation therewith and adapted to be engaged and disengaged from the first gear, a pivoted lever carried by the housing and having loose connection with the second gear whereby to move the same upon the shaft and engage and disengage it with the first gear, as and for the purpose set forth.

2. A device of the class described including a drive shaft, traction wheels connected to each end thereof, casings mounted upon said shaft upon opposite sides of the center, a housing connected to said casings and supported upon the shaft at the central portion thereof, a transverse casing extending through the housing at right angles to the main shaft, a gear carried thereby, a second gear movable upon the main shaft and adapted for engagement with the first gear, means for moving said second gear into and out of engagement with the first gear, a connecting rod movable through the transverse casing, a cutting blade secured to the lower end thereof, a pivoted lever supported by the housing, and means for loosely connecting the inner end of said lever with the upper end of the connecting rod, whereby to raise and lower said cutting blade, as and for the purpose set forth.

3. A device of the class described including a main shaft having traction wheels connected to each end thereof, a housing supported by said shaft, a tubular casing extending through said housing at right angles to the shaft, a gear carried thereby, a second gear movable upon the main shaft adapted for engagement with the first gear, a rod movable through the casing and adapted for rotation therewith, a cutting blade carried by the lower end of said rod, a bar extending upwardly from the housing, a rack carried thereby, a pivoted lever mounted upon the bar and having means for engagement with the rack, a block pivotally connected to the inner end of the lever, and means whereby to loosely connect said block with the upper end of the rod to raise and lower said cutting blade upon the actuation of the lever.

4. A device of the class described including a driving shaft, a second shaft extending at right angles to the driving shaft, a gear carried thereby, a second gear slidably mounted upon the driving shaft and adapted for engagement with the first gear, a housing inclosing said gear, a pivoted lever carried by the housing having movable connection with the second gear, whereby to actuate the same and engage and disengage with the first gear, means for raising and lowering the first shaft, and a cutting blade supported at the lower end of the first shaft, as and for the purpose set forth.

5. A device of the class described including a driving shaft, a housing supported thereby, a second shaft extending at right angles to the first, a crank portion at the lower end thereof, a cutting blade supported by the crank portion, a gear upon the second shaft and arranged within the housing, a second gear slidably mounted upon the shaft and adapted for engagement with the first gear, a pivoted lever carried by the housing and having pivotal connection with the second gear whereby to engage and disengage the same with respect to the first gear, and a second pivoted lever supported by the housing and having loose connection with the upper end of the second shaft, whereby to raise and lower the same as and for the purpose set forth.

In testimony whereof we hereunto affix our signatures in the presence of two witnesses.

DEE W. KIRBY.
COLUMBUS H. HOWARD.

Witnesses:
J. H. CUFFMAN,
C. B. MAY.

Copies of this patent may be obtained for five cents each, by addressing the "Commissioner of Patents, Washington, D. C."